Jan. 12, 1943. W. H. FRANK ET AL 2,308,362
ELECTRICAL DISTRIBUTION SYSTEM
Filed April 13, 1940 3 Sheets-Sheet 1
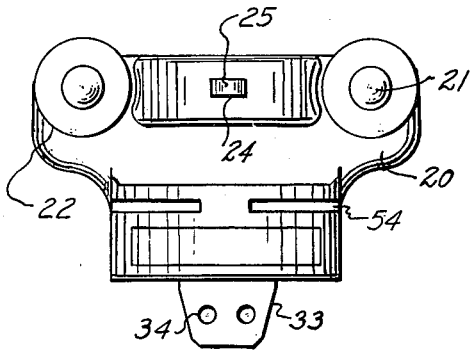
Fig. 1
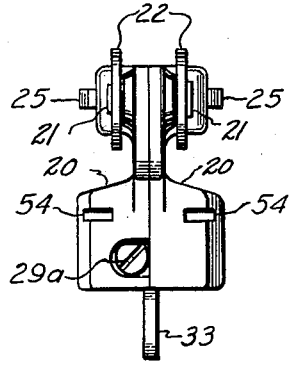
Fig. 2
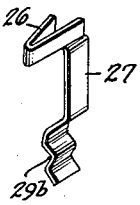
Fig. 4
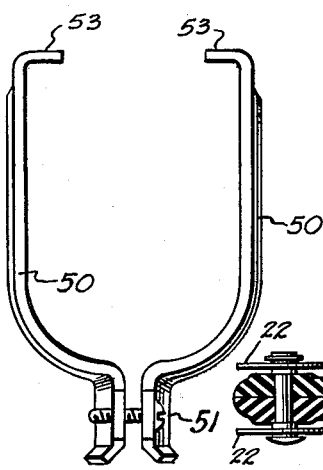
Fig. 8.
Fig. 5.
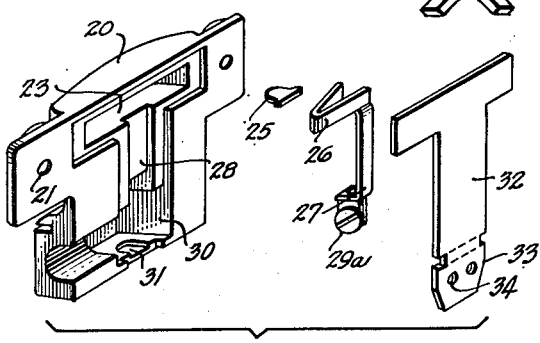
Fig. 3.
INVENTORS
William H. Frank
Arthur S. Bassette
BY Daniel G. Cullen
ATTORNEY.

Jan. 12, 1943.  W. H. FRANK ET AL  2,308,362
ELECTRICAL DISTRIBUTION SYSTEM
Filed April 13, 1940   3 Sheets-Sheet 3

William H. Frank,
Arthur J. Passette  INVENTORS
BY Daniel G. Cullen
ATTORNEY.

Patented Jan. 12, 1943

2,308,362

UNITED STATES PATENT OFFICE 2,308,362

ELECTRICAL DISTRIBUTION SYSTEM

William H. Frank and Arthur S. Bassette, Detroit, Mich., assignors to Bulldog Electric Products Company, Detroit, Mich., a corporation of West Virginia Application April 13, 1940, Serial No. 329,416

5 Claims. (Cl. 191—45)

This application relates to detachable collectors suitable for use with slotted tubular bus duct of the character shown in a patent, No. 2,134,753 of November 1, 1938. That patent shóws a bus duct and a twistout detachable non-slidable connector type collector for use therewith. This application relates to novel forms of collectors for use with the same duct, and also to appurtenances forming part of such collectors. The type here shown is a slidable or trolley type collector, another type, not here shown, is a non-slidable or connector type collector.

A principal object of the present invention is to provide collectors so formed that a stock of parts may be combined in various forms to produce various collectors, some of the parts being useful in several forms of collectors. Thus, it is possible to manufacture and maintain a stock of parts, different ones of which may be selected for combining into different forms of collectors.

For an understanding of the invention, reference should be had to the description which follows and to the appended drawings. In these drawings, Figs. 1 and 2 are side and end views of a slidable or trolley type collector;

Fig. 3 is an exploded view of the trolley;

Fig. 4 shows a contact for use in the trolley;

Fig. 5 is a plan section;

Fig. 8 shows a cord support for use with the trolley, as desired;

The duct

Figure 9:
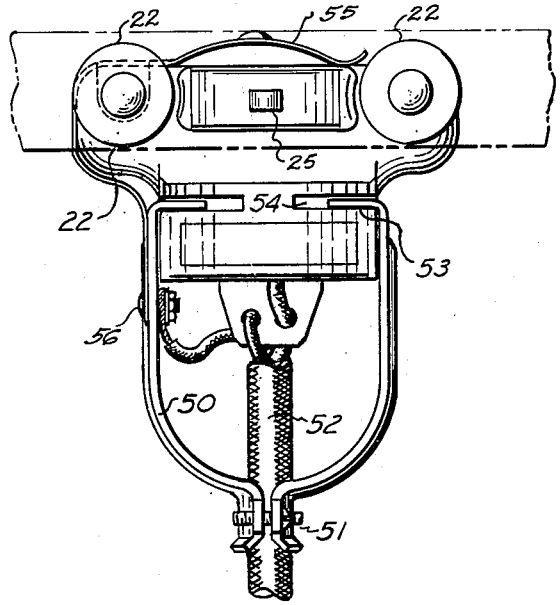
Figs. 9 and 10 show the cord support as used on a trolley; these figures also show the trolley equipped for grounding.

The duct consists of a slotted tube 10 of sheet metal having track-forming beads 11 and bus bars 12 insulatedly supported in the duct. A narrow slot 14 communicates the interior of the duct with the outside. In this duct may be placed a collector which may be of the trolley form, that is to say, normally intended to be moved along the duct, or of the connector form, normally intended to be placed in the duct and left where so placed.

The trolley form of collector

Figs. 1-5 show a trolley form of collector consisting of two identical molded body portions 20 which are complementary and which may be associated and held together by means of shouldered rivets passed through their holes 21, the rivets having, on their ends, between their shoulders and their heads, wheels 22 forming rollers for the trolley. The upper parts of the body portions have longitudinal deep recesses 23 communicating, through small openings 24, to the outside, and in these small openings are bus bar engaging contact points 25 adapted to be engaged by the spring portions 26 of the contact straps 27 seated in vertical grooves 28 of the body portions. The walls of openings 24 guide contacts 25 in their movements, and shoulders on the inner edges of the contacts 25 limit outward movement of the contacts. The lower ends 29 of the straps 27 may be formed either as binding posts 29a for wire terminals, in the event the trolley is to be of the terminal type, or may be formed as contacts 29b for cooperation with prongs of cap plugs in the event the trolley is to be of the receptacle type. The lower portions 29 of the straps 27, whether they be binding posts 29a or spring contacts 29b, are seated within deep recesses 30 in the lower parts of the body portions 20 of the trolley. The lower horizontal walls of the body portions 20 are formed with small openings 31 through which may be threaded wire terminals, in the event the trolley is of the wire terminal type, to cooperate with the binding posts 29a, or through which may be passed plug prongs for cooperation with the contact portions 29b at the lower ends of the straps 27, in the event the trolleys are of the receptacle type.

Figure 5A:
Fig. 5a shows a contact spring for use with contacts of the devices.
Figure 7:
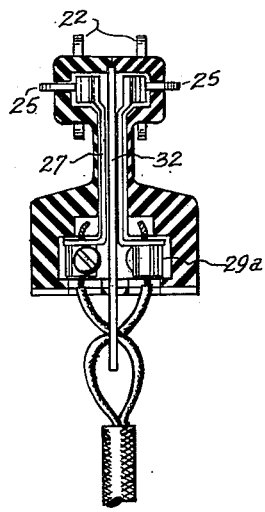
Fig. 7 is a similar view but showing it formed as a terminal type trolley.

On the ends of the contacts 29b, Fig. 4, may be fastened the springs 29c of Fig. 5a for surrounding plug prongs.

Adapted to be placed between the two body portions 20 when these are put face to face with each other to form a complete trolley is a T-shaped barrier plate 32 of insulation. The upper portion of the plate 32 closes the recesses 23 and forms a barrier between the contacts 25 and the upper ends 26 of straps 27. The central portion of the plate 32 forms a barrier between the central portions of the straps 27. The lower portion of the plate 32 forms a barrier between the lower ends 29 of the straps 27. The lower end of strap 32 is formed with an extension 33, provided with holes 34 for relieving strain on the terminals of the connected cord, and utilized only in the event the trolley is to be of the terminal type. However, if the trolley is to be of the receptacle type, then the extension 33 is broken off at the score lines shown in Fig. 3, leaving plate 32 without such extension.

Thus, it will be seen that from a stock of the parts shown, it is possible to make up a terminal type trolley collector or a receptacle type trolley collector, as desired.

The receptacle type trolley collector, to be used with a cap plug having prongs, consists of body portions 20, contacts 25, straps 27, each having contact ends 29b and 29c, and a plate 32 without the extension 33. On the other hand, for a terminal type trolley collector, body portions 20, contacts 25, straps 27 equipped with terminal binding posts 29a rather than with contacts 29b, and a plate 32 having an extension 33, are utilized.

Accessories

Figure 10:
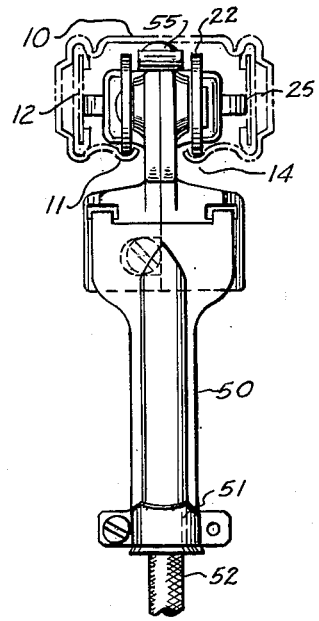
Figure 6:
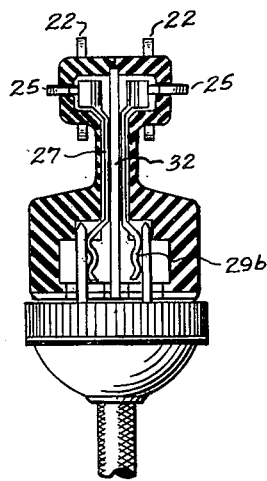
Fig. 6 shows the trolley, in end section, formed as a receptacle type trolley.

Fig. 8 shows a cord support which may be utilized in connection with the trolley of Figs. 1–7, as in Figs. 9–10. The cord support includes two straps 50 having ends 51 formed for clamping a cord 52 between them and having hook ends 53 adapted to hook into slots 54 in the outside of the collector body, whether that body be a trolley body 20 or a connector body 40. Thus, the cord support is interchangeable for use with either a trolley body 20 having slots 54 or a connector body 40 having slots 54.

The cord supports 50 and grooves 54 cooperate to interlock the trolley and the cord support, whereby load on the latter may be absorbed by the former, and also cooperate to hold the parts of the former together, thus helping the rivets (axles) in holes 21 of the trolley.

Figure 14:
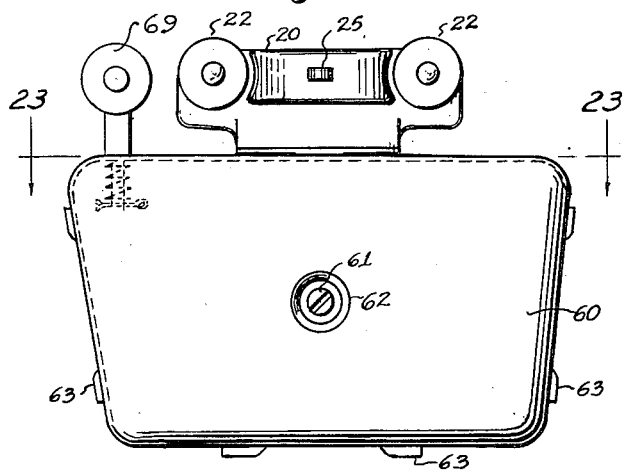
Figure 15:
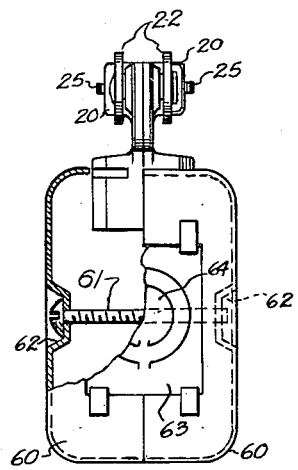

The cord support, when used with a trolley, may be formed with an extension 55 (Figs. 14–15) for engaging the upper surface of the duct for grounding, and a third wire of the cord 52 will be connected to the cord support, as at 56, for this purpose.

Figure 11:
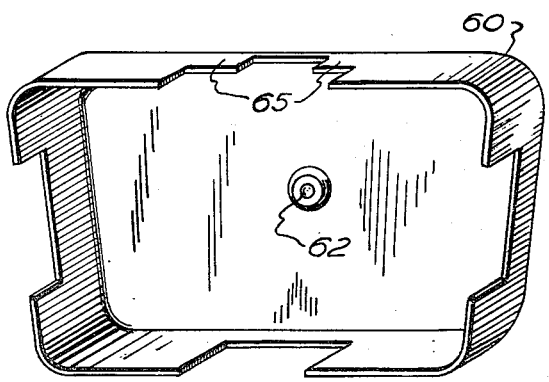
Figs. 11 and 12 show an outlet box for use with the trolley, as desired.
Figure 12:
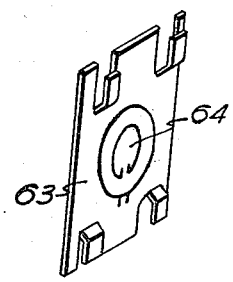

Figs. 11 to 12 show an outlet box consisting of two complementary portions 60 which may be connected by a bolt 61 passed through their holes 62 and having openings adapted to be closed by closure plates 63 provided with knockouts 64. A box thus formed may be associated with a trolley by inserting the corners 65 of the top opening of the box into the slots 54 of the trolley body 20.

The outlet box, like the cord support, interlocks itself to the trolley and helps hold the parts of the latter together.

Figure 13:
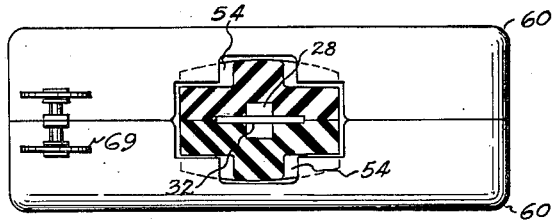
Figs. 13-15 show the outlet box in use on a trolley; these figures also show the box equipped for grounding.

When the box is used with a trolley, resiliently mounted grounding roller contacts 69 (Figs. 13–14) may be utilized to ground the box to the duct and thus ground the duct to a ground wire conected to the box.

Now having described the invention herein disclosed, reference should be had to the claims which follow for a determination of this invention.

We claim:

1. A collector for use with slotted tube bus duct, consisting of two identical complementary molded body portions whose mating faces are within the duct slot when the collector is in the duct, the mating faces having facing grooves and recesses for containing contacts and connecting parts inserted into the body portions by way of the exposed mating faces, with some of the contacts projecting through openings in the sides of the body portions remote from the mating faces, pins passed transversely through the bodies for holding them together, and having collector supports on their ends, and spaced openings in the lower face of the collector, which is transverse to the mating faces of the collector, and on opposite sides of the meeting line of the mating faces opening into the interior of the collector and formed for receiving wire terminals or cap plug prongs, each body portion, and its bus engaging contact, and its other live parts comprising a self contained preassemblable unit, with the two units thus formed being held together by the pins.

2. A collector for use with slotted tube bus duct, consisting of two identical complementary molded body portions whose mating faces are within the duct slot when the collector is in the duct, the mating faces having facing grooves and recesses for containing contacts and connecting parts inserted into the body portions by way of the exposed mating faces, with some of the contacts projecting through openings in the sides of the body portions remote from the mating faces, pins passed transversely through the bodies for holding them together, and having collector supports on their ends, and spaced openings in the lower face of the collector, which is transverse to the mating faces of the collector, and on opposite sides of the meeting line of the mating faces opening into the interior of the collector and formed for receiving wire terminals or cap plug prongs, each body portion, and its bus engaging contact, and its other live parts comprising a self contained preassemblable unit, with the two units thus formed being held together by the pins, the collector having a barrier plate disposed between the mating faces for isolating live parts of different polarity and closing the open faces of the recesses and grooves in the body portions which open to such faces.

3. A collector for use with slotted tube bus duct, consisting of two identical complementary molded body portions whose mating faces are within the duct slot when the collector is in the duct, the mating faces having facing grooves and recesses for containing contacts and connecting parts inserted into the body portions by way of the exposed mating faces, with some of the contacts projecting through openings in the sides of the body portions remote from the mating faces, pins passed transversely through the bodies for holding them together, and having collector supports on their ends, and spaced openings in the lower face of the collector, which is transverse to the mating faces of the collector, and on opposite sides of the meeting line of the mating faces opening into the interior of the collector and formed for receiving wire terminals or cap plug prongs, each body portion, and its bus engaging contact, and its other live parts comprising a self contained preassemblable unit, with the two units thus formed being held together by the pins, the collector having a barrier plate disposed between the mating faces for isolating live parts of different polarity and closing the open faces of the recesses and grooves in the body portions which open to such faces, the lower end of the barrier plate projecting below the lower transverse face of the collector and having holes for relieving strain on the terminals of conductors entered into the collector through the holes in the lower transverse face of the collector, the collector having wire terminal binding means alined with such holes and formed to permit terminals threaded into the trolley through such holes to be threaded into the binding means.

4. A collector for use with slotted tube bus duct, consisting of two identical complementary molded body portions whose mating faces are within the duct slot when the collector is in the duct, the mating faces having facing grooves and recesses for containing contacts and connecting parts inserted into the body portions by way of the exposed mating faces, with some of the contacts projecting through openings in the sides of the body portions remote from the mating faces, pins passed transversely through the bodies for holding them together, and having collector supports on their ends, and spaced openings in the lower face of the collector, which is transverse to the mating faces of the collector, and on opposite sides of the meeting line of the mating faces opening into the interior of the collector and formed for receiving wire terminals or cap plug prongs, each body portion, and its bus engaging contact, and its other live parts comprising a self contained preassemblable unit, with the two units thus formed being held together by the pins, the lower ends of the connecting parts in the collector being alined with the holes in the lower face thereof and being formed to receive and engage cap plug prongs inserted into an assembled collector through such holes.

5. A collector for use with slotted tube bus duct, consisting of two identical complementary molded body portions whose mating faces are within the duct slot when the collector is in the duct, the mating faces having facing grooves and recesses for containing contacts and connecting parts inserted into the body portions by way of the exposed mating faces, with some of the contacts projecting through openings in the sides of the body portions remote from the mating faces, pins passed transversely through the bodies for holding them together, and having collector supports on their ends, and spaced openings in the lower face of the collector, which is transverse to the mating faces of the collector, and on opposite sides of the meeting line of the mating faces opening into the interior of the collector and formed for receiving wire terminals or cap plug prongs, each body portion, and its bus engaging contact, and its other live parts comprising a self contained preassemblable unit, with the two units thus formed being held together by the pins, the lower ends of the connecting parts in the collector being alined with the holes in the lower face thereof and being formed to receive and engage cap plug prongs inserted into an assembled collector through such holes, the collector having a barrier plate disposed between the mating faces for isolating live parts of different polarity and closing the open faces of the recesses and grooves in the body portions which open to such faces.

WILLIAM H. FRANK.
ARTHUR S. BASSETTE.